United States Patent [19]

Parshall

[11] 3,919,271

[45] Nov. 11, 1975

[54] CATALYSIS BY DISPERSIONS OF METAL HALIDES IN MOLTEN TRIHALOSTANNATE (II) AND TRIHALOGERMANATE (II) SALTS

[75] Inventor: George W. Parshall, Wilmington, Del.

[73] Assignee: E. I. Du Pont de Nemours and Company, Wilmington, Del.

[22] Filed: June 10, 1974

[21] Appl. No.: 477,777

Related U.S. Application Data

[60] Division of Ser. No. 214,376, Dec. 30, 1971, Pat. No. 3,832,391, which is a division of Ser. No. 92,541, Nov. 24, 1970, Pat. No. 3,657,368, which is a continuation-in-part of Ser. No. 727,710, May 8, 1968, Pat. No. 3,565,823.

[52] U.S. Cl. .......................... 260/409; 260/488 F

[51] Int. Cl.$^2$ .......................................... C11C 3/12
[58] Field of Search .................... 260/488 F, 409

[56] References Cited
UNITED STATES PATENTS

| 2,671,097 | 3/1954 | Royce | 260/409 |
|---|---|---|---|
| 3,341,570 | 9/1967 | Barie | 260/488 F |
| 3,489,778 | 1/1970 | Van't Hof | 260/409 |

*Primary Examiner*—Patrick P. Garvin
*Assistant Examiner*—John F. Niebling

[57] ABSTRACT

Dispersions of transition and other metal halides in molten tetrahydrocarbylammonium or phosphonium trihalostannate(II) and trihalogermanate(II) salts are useful as catalysts for the hydrogenation of olefins and the hydrogenation of nitriles.

3 Claims, No Drawings

CATALYSIS BY DISPERSIONS OF METAL HALIDES IN MOLTEN TRIHALOSTANNATE (II) AND TRIHALOGERMANATE (II) SALTS

CROSS-REFERENCE TO RELATED APPLICATIONS

This application is a division of my copending application Ser. No. 214,376, filed Dec. 30, 1971, now U.S. Pat. No. 3,832,391, which in turn is a division of my copending application Ser. No. 92,541, filed Nov. 24, 1970, now U.S. Pat. No. 3,657,368, which is in turn a continuation-in-part of my copending application Ser. No. 727,710 filed May 8, 1968, now U.S. Pat. No. 3,565,823.

BACKGROUND OF THE INVENTION

A. Field of the Invention

This invention relates to the use of the dispersions of metal halides in molten quaternary ammonium trihalostannate(II) or trihalogermanate(II) salts of my above-mentioned application as catalysts in processes for hydrogenating olefins and for hydrogenating nitriles.

B. Description of the Prior Art

The following references are of interest in connection with the invention of this application.

1. R. D. Cramer et al., J. Am. Chem. Soc., 85, 1691 (1963). Solutions of chloroplatinic acid and stannous chloride are effective catalysts for the hydrogenation of olefins.

2. G. C. Bond et al., J. Catal., 7, 217 (1967). Solutions of chloroplatinic acid and stannous chloride are effective catalysts for the isomerization of 1-pentene to its equilibrium mixture with 2-pentenes.

3. H. van Bekkum et al., J. Catal., 7, 292 (1967). Solutions of chloroplatinic acid and stannous chloride catalyze the hydrogenation of cyclohexene and the selective hydrogenation of dienes to monoenes.

4. L. P. van't Hoff et al., J. Catal., 7, 295 (1967). Solutions of chloroplatinic acid and stannous chloride are used as catalysts for the hydrogenation of soybean oil. Methyl linoleate gives predominantly methyl oleate.

5. F. N. Jones, J. Org. Chem., 32, 1667 (1967) and U.S. Pat. No. 3,397,252 (1968). Inter alia, vinyl chloride is reductively coupled to yield butadiene by Sn(II) in solutions containing catalytic amounts of $PtCl_2$, cesium fluoride acting as cocatalyst.

The following art may also be of interest.

6. Th. Kruck et al., Angew Chem. internat. Edit., 8, 679 (1969). The reaction of trichlorostannate salts with metal carbonyls is used to produce complexes containing the $SnCl_3$ ligand. Tetraethylammonium trichlorostannate is used in one experiment although not above its melting point.

7. Japanese Patent 7,005,255 (1970). Aliphatic polyolefins will hydrogenate to monoolefins with the catalyst $HPtSnCl_3(PR_2)$.

8. R. W. Adams et al., Inorg. Nucl. Chem. Letters, 4, 455 (1968). A mixture of dichlorobis(triphenylphosphine)platinum and stannous chloride is effective as a catalyst for the hydrogenation of terminal olefins and for the hydrogenation and isomerization of dienes.

SUMMARY OF THE INVENTION

This invention is directed to processes employing as catalysts the liquid dispersions of my above-identified copending application and patents. These dispersions, which include molecular dispersions, consist essentially of: (A) at least 0.05 weight percent of a chloride-, bromide- or iodide-containing salt of a metal having an atomic number of 26–28, 44–46 or 76–78; and (B) a molten salt of a compound of the formula $(R^1R^2R^3R^4Q)YX_3$ wherein $R^1$, $R^2$, $R^3$ and $R^4$, independently, contain up to 18 carbons and are alkyl, cycloalkyl, aryl, alkaryl or aralkyl; or $R^1$ and $R^2$, conjointly, contain 4 to 6 carbons and is alkylene; or $R^1$, $R^2$, $R^3$ and Q conjointly is pyridinium or quinolinium; Q is nitrogen or phosphorus; Y is tin or germanium; and X is chlorine or bromine.

The dispersions can be made, for example, by mixing components A and B at a temperature above the melting point of component B, as is fully disclosed in my copending application. Dispersions formed and claimed in the copending application include the following:

N,N,N,N-tetraethylammonium trichlorostannate(II) containing: $PtCl_2$; $PdCl_2$; $RuCl_3$ hydrate; $RhCl_3$ hydrate; $IrCl_3.4H_2O$; $OsCl_3$; $ReCl_3$; $CoCl_2$; $CoCl_2.6H_2O$; $H_2PtCl_6.nH_2O$; $FeCl_2$; $FeCl_3$; $MnCl_2$; $CrCl_2$; $CrCl_3$; $VCl_3$; $TiCl_3$; $NiCl_2$; $NiBr_2$; $NiI_2.6H_2O$; $IrBr_3$; $K_2PtCl_4$; $K_2PdCl_4$; $WCl_6$; $MoCl_3$; $(Et_3P)_2PtCl_2$ (Et is ethyl); $(NO)RuCl_3.3H_2O$; $AuCl_3$; and N,N,N,N-tetraethylammonium trichlorogermanate(II) containing: $NiBr_2.6H_2O$; $CoCl_2$; $PdCl_2$; $RuCl_2.3H_2O$; $RhCl_3.H_2O$; etc.

In the present invention, all the above-mentioned dispersions serve as catalysts in a process for the hydrogenation of olefins and nitriles.

A. Hydrogenation

The process for the hydrogenation of olefins or nitriles is conducted by heating a mixture of hydrogen and an olefin, including a cycloolefin, or a nitrile in the presence of a catalytically effective amount of at least one of the above-noted metal halide-trihalostannate(II) or -trihalogermanate(II) dispersions at a temperature of at least the melting point temperature of said dispersion.

Any olefin can be hydrogenated according to the invention, but the reaction may be expressed more particularly by the equation which follows (Δ signifies that the temperature is high enough to keep the catalyst molten):

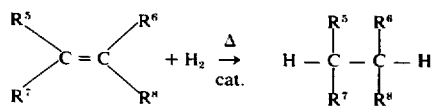

wherein $R^5$, $R^6$, $R^7$ and $R^8$, individually, are hydrogen, alkyl of up to 12 carbons, alkenyl of up to 12 carbons, aryl of up to 10 carbons, aralkyl of up to 10 carbons, alkaryl of up to 10 carbons, aralkenyl of up to 10 carbons, alkoxycarbonylalkyl of up to 14 carbons, alkoxycarbonylalkenyl of up to 14 carbons, -$COOR^9$ or -$COR^9$ where $R^9$ is lower alkyl; or $R^5$ and $R^7$ conjointly is alkylene or alkenylene of 4 to 6 carbons; or $R^5$ and $R^6$ is alkylene or alkenylene of up to 10 carbons or the divalent radical of the formula:

with the proviso that at least two of $R^5$, $R^6$, $R^7$ and $R^8$ are hydrogen. Included within the definition of the olefin are 1,5-cyclooctadiene, 1,5-cyclododecadiene and 1,5,9-cyclododecatriene.

In the hydrogenation of olefins, as in all the processes of the invention, an effective catalytic amount of the dispersions of my above-mentioned application or mixtures thereof is used. In general, an effective catalytic amount will be dependent upon the conditions, the reactants, the particular process and metal halide dispersion. Preferably, 0.005 to 10 weight percent of the metal halide in the dispersion based on the olefin reactant is used. Most preferably, 0.5 to 5 weight percent of the metal halide in the dispersion is used.

The rates of reaction of the processes are dependent upon the temperature and the reactants used. In general, the temperature of reaction will be as low as about 10°C. and up to 350°C.

Pressure reactors may be necessary for the processes to effect reaction. In general, the pressure will be autogenous pressures to 1500 atmospheres or higher.

The time of the reaction will vary from a very short time of a few minutes or less to a few hours or longer. Shorter reaction times are preferred since they give more economical processes.

The process of hydrogenation of nitriles, except for the nitrile reactant, employs essentially the conditions of the hydrogenation of olefins, and may be expressed by the equation:

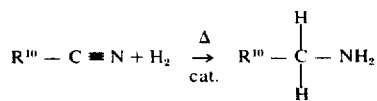

wherein $R^{10}$ may be saturated alkyl, saturated cycloalkyl, aryl, alkaryl, aralkyl and aralkaryl, each of up to 18 carbons, and nitrile mono-substituted derivatives of these.

B. Products

The hydrogenated products are, in general, known chemicals. They can be isolated by known methods, e.g., by distillation of the reaction mixture. Alternatively, the crude reaction mixture can be isolated by first washing with water followed by separating of the hydrocarbon layer from the water layer. Pure product is then obtained by distillation.

The compounds produced by the hydrogenation of olefins are useful as solvents and as chemical intermediates, such as precursors of fiber-forming polyamides. For example, 1,5,9-cyclododecatriene can be hydrogenated to cyclododecene which can be oxidized with dilute potassium permanganate to dodecanedioic acid. Dodecandioic acid reacts with diamines such as hexamethylenediamine to form a salt which can be heated under vacuum at a temperature of about 200°C. to form a fiber-forming polyamide. Fibers can be prepared from the polyamide by melt spinning.

Esters are useful as solvents and as plasticizers. Lower molecular weight esters, particularly those containing up to 10 carbon atoms, are useful as solvents and diluents in paints and varnishes. Higher molecular weight esters, particularly those containing 8 carbon atoms and more, are useful as plasticizers for polymers such as polyvinyl chloride, polymethyl methacrylate and polystyrene.

EMBODIMENTS OF THE INVENTION

The following examples, in which parts and percentages are by weight, illustrate the catalytic activity of the dispersions of the metal salts in tetraalkylammonium trihalostannate(II) and trihalogermanate(II) salts in the processes of the invention.

The preparation of the catalyst dispersions or solutions is in general obvious and described above. Examples 1 to 8 involve a procedure sometimes preferred for convenience. In this procedure, component A was first dissolved or dispersed in molten component B. The melt was then filtered to remove any undissolved or undispersed component A and the product allowed to solidify by cooling. It was then crushed so that the indicated amount of catalyst could be weighed out. In each example, the temperature specified for carrying out the reaction was high enough to insure that the previously prepared catalyst was molten during the process.

EXAMPLE 1

HYDROGENATION OF METHYL LINOLEATE

A mixture of 5.0 ml of methyl linoleate and 50 g of a 1% solution of platinum dichloride prepared in molten tetraethylammonium trichlorostannate(II) was agitated at 150°C for 6 hours in a 80-ml stainless steel tube under a hydrogen pressure of 100 atmospheres. The solid residue from the reaction vessel was distilled directly at 200°C at 0.2 mm to give 3 ml of a cloudy liquid. The liquid was redistilled to give 2.0 g of a clear, colorless liquid, $n_D^{26}$ 1.4522. (The refractive index is that expected for methyl oleate or one of its positional isomers.) The gas chromatogram of the product showed 62.8 area percent of a peak assignable to methyl oleate and 15.4 area percent of a peak assignable to an isomeric monoolefin.

When the unsaturated compounds shown in Table I are substituted for methyl linoleate in the hydrogenation procedures of Example 1, the compounds shown as hydrogenation products are the principal products obtained. It may be noted that with the unsaturated compounds of Example 1 and Table I, the formula becomes

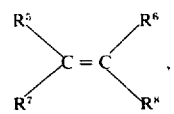

at least two and not more than three of $R^5$, $R^6$, $R^7$ and $R^8$ are hydrogen, with the proviso that when two are hydrogen, one may be alkyl of up to 12 carbons, and the other one or two of $R^5$, $R^6$, $R^7$ and $R^8$ are alkoxycarbonylalkyl or alkoxycarbonylalkenyl of up to 14 carbons, or -COOR$^9$ or -COR$^9$, where $R^9$ is lower alkyl.

TABLE I

| Item | Olefin | Hydrogenation Product(s) |
|---|---|---|
| 1 | Ethyl 5-octenoate | Ethyl octoate |
| 2 | Amyl undecylenate | Amyl undecanoate |
| 3 | Methyl sorbate | Methyl 2-hexenoate and methyl hexanoate |
| 4 | Propyl linoleate | Propyl oleate and propyl octadecanoate |
| 5 | Methyl arcylate | Methyl propionate |
| 6 | Ethyl-2-nonenoate | Ethyl nonanoate |
| 7 | Ethyl vinyl ketone | Diethyl ketone |
| 8 | Isopropenyl methyl ketone | Isopropyl methyl ketone |

EXAMPLE 2

HYDROGENATION OF A NITRILE

A mixture of 5.0 ml of acetonitrile and a solution of 0.5 g of platinum dichloride prepared in molten tetraethylammonium trichlorostannate(II) was agitated at 150°C. for 8 hours in an 80-ml stainless steel tube under a hydrogen pressure of 100 atmospheres. The crude reaction product was extracted with benzene. Gas chromatographic analysis of the extract showed the presence of ethylamine in addition to unchanged acetonitrile.

The following Examples were carried out as described in Example 2:

| Example | Metal Halide | Temp/Pres. | Result |
|---|---|---|---|
| 3 | $IrCl_3 \cdot 3H_2O$ | 150°C/160 atm. | $C_2H_5NH_2$ formed |
| 4 | $RhCl_3 \cdot 3H_2O$ | 150°C/160 atm. | $C_2H_5NH_2$ formed |

When the nitriles shown in Table II are substituted for acetonitrile in the procedures of Examples 2–4, the indicated amines are the principal products obtained.

TABLE II

| Item | Nitrile | Amine |
|---|---|---|
| 1 | Acetonitrile | Ethylamine |
| 2 | Propionitrile | Propylamine |
| 3 | Isobutyronitrile | Isobutylamine |
| 4 | Lauronitrile | Laurylamine |
| 5 | Stearonitrile | Stearylamine |
| 6 | Cyclopropane-carbonitrile | (Cyclopropylmethyl)amine |
| 7 | Cyclopentane-carbonitrile | (Cyclopentylmethyl)amine |
| 8 | Cyclohexane-carbonitrile | (Cyclohexylmethyl)amine |
| 9 | Dicyclopentyl-acetonitrile | (2,2-Dicyclopentylethyl)amine |
| 10 | Benzonitrile | Benzylamine |
| 11 | p-Tolunitrile | p-Methylbenzylamine |
| 12 | 1-Phenylcyclo-propane-carbonitrile | (1-Phenylcyclopropylmethyl)amine |
| 13 | α-Naphthonitrile | α-Naphthylmethylamine |
| 14 | 1-Phenanthrene-carbonitrile | 1-Phenanthrylmethylamine |
| 15 | β,β,β-Triphenyl-propionitrile | 3,3,3-Triphenylpropylamine |
| 16 | Malononitrile | 1,3-Propylenediamine |
| 17 | Succinonitrile | 1,4-Butylenediamine |
| 18 | Adiponitrile | Hexamethylenediamine |
| 19 | Phthalonitrile | o-Xylylene-α,α'-diamine |
| 20 | Sebaconitrile | Decamethylenediamine |
| 21 | Biphenyl-4,4'-dicarbonitrile | 4,4'-Bibenzylamine |

Since obvious modifications and equivalents will be evident to those skilled in the chemical arts, I propose to be bound solely by the appended claims.

The embodiments of the invention in which an exclusive property or privilege is claimed are defined as follows:

1. The hydrogenation process which comprises contacting
   a. hydrogen and
   b. an unsaturated compound of the formula

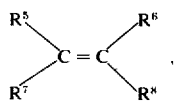

wherein at least two and not more than three of $R^5$, $R^6$, $R^7$ and $R^8$ are hydrogen and the remainder are selected from the group consisting of alkoxycarbonylalkyl and alkoxycarbonylalkenyl of up to 14 carbons, and $-COOR^9$, and $-COR^9$, where $R^9$ is lower alkyl, except that when two are hydrogen, one may be alkyl of up to 12 carbons, with
   c. a dispersion in an amount sufficient to catalytically effect hydrogenation, said dispersion consisting essentially of:
      A. at least 0.05 weight percent of a chloride-, bromide- or iodide-containing salt of a metal having an atomic number of 26–28, 40–46, or 76–78; and
      B. a molten salt of the formula $$(R^1R^2R^3R^4Q)YX_3,$$

wherein
   1. $R^1$, $R^2$, $R^3$, and $R^4$, independently, contain up to 18 carbons and are alkyl, cycloalkyl, aryl, alkaryl, or aralkyl; or
   2. $R^1$ and $R^2$, conjointly, contains 4 to 6 carbons and is alkylene; or
   3. $R^1$, $R^2$, $R^3$ and Q conjointly is pyridinium or quinolinium;
   4. Q is nitrogen or phosphorus;
   5. Y is tin or germanium; and
   6. X is chlorine or bromine, at a temperature between about 10° and 350°C. and above the melting point of the dispersion until said unsaturated compound is substantially hydrogenated.

2. The process of claim 1 wherein methyl linoleate is hydrogenated.

3. The process of claim 1 wherein 1, 5, 9-cyclododecatriene is hydrogenated to cyclododecene.

* * * * *